US012739555B2

(12) United States Patent
Chang et al.

(10) Patent No.: US 12,739,555 B2
(45) Date of Patent: Sep. 15, 2026

(54) HEAD-MOUNTED DEVICE AND RETRACTABLE HEADBAND

(71) Applicant: HTC Corporation, Taoyuan City (TW)

(72) Inventors: Li-Hsun Chang, Taoyuan City (TW); Kuan-Ying Ou, Taoyuan City (TW); Chen-Fu Chang, Taoyuan City (TW); Chih-Hsiang Hsieh, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 135 days.

(21) Appl. No.: 18/762,658

(22) Filed: Jul. 3, 2024

(65) Prior Publication Data

US 2025/0048018 A1 Feb. 6, 2025

Related U.S. Application Data

(60) Provisional application No. 63/530,255, filed on Aug. 2, 2023.

(51) Int. Cl.
*H04R 1/10* (2026.01)
*H04R 1/02* (2006.01)

(52) U.S. Cl.
CPC ........... *H04R 1/1066* (2013.01); *H04R 1/028* (2013.01); *H04R 1/1008* (2013.01); *H04R 1/105* (2013.01); *H04R 2499/15* (2013.01)

(58) Field of Classification Search
CPC .... H04R 1/1066; H04R 1/028; H04R 1/1008; H04R 1/105; H04R 2499/15;
(Continued)

(56) References Cited

U.S. PATENT DOCUMENTS 5,757,339 A 5/1998 Williams et al.
5,767,820 A * 6/1998 Bassett .................. G06F 3/011 348/E5.145

(Continued)

FOREIGN PATENT DOCUMENTS

CN 209627620 11/2019
CN 112655221 4/2021

(Continued)

OTHER PUBLICATIONS

"Office Action of Taiwan Counterpart Application", issued on Jan. 23, 2025, p. 1-p. 9.

*Primary Examiner* — Oyesola C Ojo
(74) *Attorney, Agent, or Firm* — JCIPRNET

(57) ABSTRACT

A head-mounted device and a retractable headband are provided. The head-mounted device includes a host, a retractable headband, and an earphone. The host has a first connection part and a second connection part located on two opposite sides. The retractable headband has an earphone connection part and a first connection end and a second connection end located on two opposite sides. The first connection end is connected to the first connection part. The second connection end is connected to the second connection part. When the retractable headband is elongated by an elongation amount, a change in a distance between the earphone connection part and the first connection end is less than half of the elongation amount. The earphone is connected to the earphone connection part.

12 Claims, 2 Drawing Sheets

(58) Field of Classification Search
CPC ...... H04R 2201/025; G02B 2027/0161; G02B 27/0176
See application file for complete search history.

(56) References Cited

U.S. PATENT DOCUMENTS

| | | | | |
|---|---|---|---|---|
| 5,815,126 | A * | 9/1998 | Fan | G02B 27/017 345/87 |
| 5,844,656 | A * | 12/1998 | Ronzani | G02B 27/0176 351/158 |
| 7,859,597 | B2 * | 12/2010 | Anderson, Jr. | H04R 27/00 725/132 |
| 9,964,770 | B2 * | 5/2018 | Guo | G02B 27/0176 |
| 11,366,325 | B2 | 6/2022 | Silfvast et al. | |
| 11,733,529 | B1 * | 8/2023 | Gallaher | G02B 27/0172 345/8 |
| 2002/0008677 | A1 * | 1/2002 | Saito | G02B 27/0176 345/8 |
| 2010/0296683 | A1 * | 11/2010 | Slippy | H04R 5/0335 381/377 |
| 2017/0160812 | A1 | 6/2017 | Park et al. | |
| 2017/0264984 | A1 * | 9/2017 | Pelland | H04R 5/0335 |
| 2018/0314323 | A1 * | 11/2018 | Mikhailov | G06T 19/006 |
| 2019/0110122 | A1 * | 4/2019 | Zelnick | H04R 1/1066 |
| 2019/0141847 | A1 * | 5/2019 | Chang | G02B 27/0176 |
| 2019/0243145 | A1 * | 8/2019 | Ellis | D04B 1/22 |
| 2020/0159028 | A1 * | 5/2020 | Araki | H04R 1/1016 |
| 2021/0018758 | A1 * | 1/2021 | Silfvast | H04R 1/028 |
| 2021/0058705 | A1 * | 2/2021 | Carr | H04R 1/1008 |
| 2024/0031715 | A1 * | 1/2024 | Justin | H04R 1/1008 |
| 2024/0385452 | A1 * | 11/2024 | Zimmerman | G02B 27/0176 |

FOREIGN PATENT DOCUMENTS

| | | |
|---|---|---|
| CN | 212905728 | 4/2021 |
| CN | 214151254 | 9/2021 |
| TW | 201843559 | 12/2018 |
| TW | 202009553 | 3/2020 |

* cited by examiner

HEAD-MOUNTED DEVICE AND RETRACTABLE HEADBAND

CROSS-REFERENCE TO RELATED APPLICATION

This application claims the priority benefit of U.S. provisional application Ser. No. 63/530,255, filed on Aug. 2, 2023. The entirety of the above-mentioned patent application is hereby incorporated by reference herein and made a part of this specification.

TECHNICAL FIELD

The present application relates to a head-mounted device and a retractable headband, and in particular to a head-mounted device and a retractable headband with removable earphones.

DESCRIPTION OF RELATED ART

With the rapid advancement of current technology, the types and functions of head-mounted devices are becoming increasingly diversified. Taking a goggle-type head-mounted device as an example, when a user wears such a device, the gyroscope and position tracker inside the head-mounted device tracks the movement of the user to display the corresponding scene image, which provides the user with an experience of being in a virtual world.

When using a head-mounted device, in addition to improving the visual experience, sound effects are also one of the key elements enhancing the immersion of the user. In the existing head-mounted device, if an earphone band is used to enhance the sound and light experience, even if the length of the headband is adjusted according to the size of the head of the user, the position of the earphones is moved by the same amount as the increased length of the headband, which cannot correspond to the position of the ears of the user.

SUMMARY

This application provides a head-mounted device and a retractable headband, whose earphone has an appropriate amount of movement, so as to provide better wearing experience and sound quality.

The head-mounted device of this application includes a host, a retractable headband, and an earphone. The host has a first connection part and a second connection part located on two opposite sides. The retractable headband has an earphone connection part and a first connection end and a second connection end located on two opposite sides. The first connection end is connected to the first connection part. The second connection end is connected to the second connection part. When the retractable headband is elongated by an elongation amount, a change in a distance between the earphone connection part and the first connection end is less than half of the elongation amount. The earphone is connected to the earphone connection part.

The retractable headband of the application is for a head-mounted device. The head-mounted device includes a host and an earphone. The host has a first connection part and a second connection part located on two opposite sides. The retractable headband has an earphone connection part and a first connection end and a second connection end located on two opposite sides. The first connection end is configured to connect the first connection part. The second connection end is configured to connect the second connection part. When the retractable headband is elongated by an elongation amount, a change in a distance between the earphone connection part and the first connection end is less than half of the elongation amount. The earphone connection part is configured to connect the headphone.

Based on the above, in the head-mounted device and the retractable headband of the present application, the change in the distance of the earphone connection part is less than half of the elongation amount of the retractable headband, which can easily fit ear positions of different users, thereby the users can obtain better sound quality.

DESCRIPTION OF THE EMBODIMENTS

Figure 1:
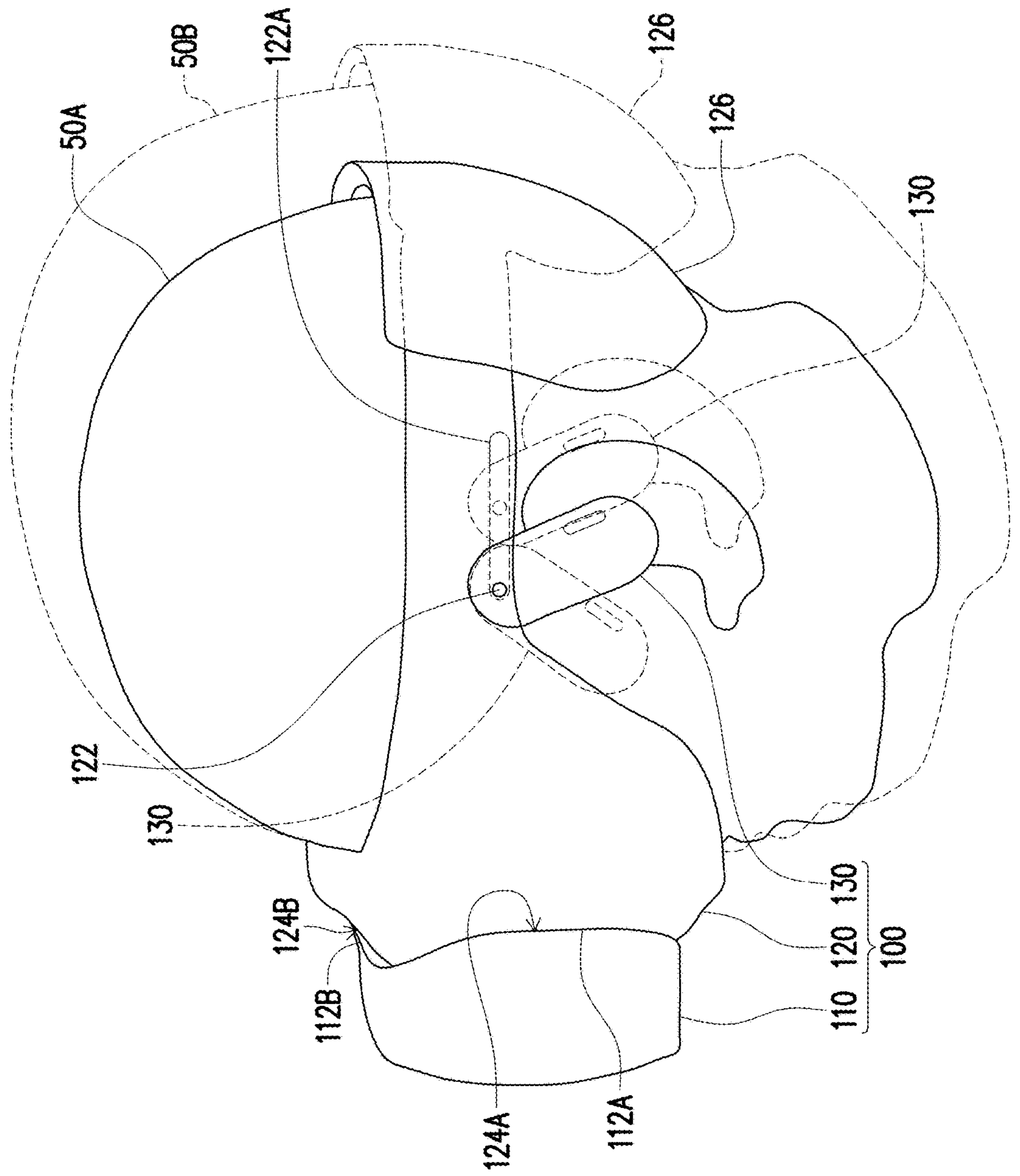
FIG. 1 is a schematic diagram of a head-mounted device according to an embodiment of the present invention being worn on heads of users having different head sizes.

FIG. 1 is a schematic diagram of a head-mounted device according to an embodiment of the present invention being worn on heads of users having different head sizes. Please refer to FIG. 1. A head-mounted device 100 of this embodiment includes a host 110, a retractable headband 120, and an earphone 130. The host 110 has a first connection part 112A and a second connection part 112B located on two opposite sides. The retractable headband 120 has an earphone connection part 122 and a first connection end 124A and a second connection end 124B located on two opposite sides. The first connection end 124A is connected to the first connection part 112A. The second connection end 124B is connected to the second connection part 112B. The first connection part 112A and the second connection part 112B are not necessarily at two most distal ends on the left and right of the host 110, but located on the two opposite sides of the host 110. Portions of the host 110 connecting the first connection end 124A and the second connection end 124B of the retractable headband 120 are the first connection part 112A and the second connection part 112B.

The length of the retractable headband 120 is retractable, and this application does not limit the specific retractable design. When the retractable headband 120 is elongated by an elongation amount, a change in a distance between the earphone connection part 122 and the first connection end 124A is less than half of the elongation amount. The elongation amount of the retractable headband 120 mentioned here refers to the increased amount of the length of the entire retractable headband 120. That is, the elongation amount of the distance from the middle point of the retractable headband 120 to the first connection end 124A is half of the elongation amount of the entire retractable headband 120. The earphone 130 is connected to the earphone connection part 122.

Since the change in the distance between the earphone connection part 122 and the first connection end 124A is less than half of the elongation amount, it is not that a moving distance of the earphone connection part 122 is the same as a moving distance of the retractable headband 120 corresponding to the middle point of the back of the head, rather, it is that the moving distance of the earphone connection part 122 is less. When the head-mounted device 100 is changed from being worn on a head 50A of a user having a smaller head circumference to being worn on a head 50B of a user having a smaller head circumference, the user elongates the retractable headband 120 by an elongation amount, and at the same time, a change in a distance between the earphone connection part 122 and the first connection end 124A also occurs. Since the amount of change is less than half of the elongation amount, the earphone connection part 122 does not move too close to the back of the head, and can remain close to the ear. In this way, the earphone 130 connected to the earphone connection part 122 can transmit sound to the ear of the user well without using a high-power earphone 130.

The retractable headband 120 in this embodiment is, for example, detachably connected to the host 110. Therefore, the retractable headband 120 can be applied to different hosts 110 according to needs.

In this embodiment, the earphone 130 is rotatable with respect to the retractable headband 120. Therefore, it is easier for the position of the earphone 130 to correspond to the ear of the user. In this embodiment, the earphone 130 may be magnetically attracted to the earphone connection part 122. In other embodiments, the earphone 130 may be connected to the earphone connection part 122 using spring probes or other methods. The earphone 130 may be fixedly connected to the earphone connection part 122, or may be detachably connected to the earphone connection part 122. The earphone 130 and the host 110 may be connected wirelessly using Bluetooth or other wireless communication protocols, or may also be connected in a wired manner. The earphone connection part 122 may be a connection base simply used for physical connection, or may be a terminal base having a signal transmission function. In this embodiment, the retractable headband 120 further has a sliding groove 122A. The earphone connection part 122 is slidably disposed in the sliding groove 122A. That is, the earphone connection part 122 may slide in the sliding groove 122A, and the sliding groove 122A guides the sliding direction of the earphone connection part 122.

The host 110 in this embodiment is a head-mounted display, and may be, for example applied to fields such as virtual reality system, augmented reality system, or mixed reality system. The host 110 may include components such as an optical system and a protective housing, and may be disposed with a display or adapted to place a display. The display may be a built-in display or an external portable display (such as a smart phone), but the present application is not limited thereto. The optical system includes optical elements used to change the optical path of the display, such as lens elements, light guiding members, or prisms. The host 110 in FIG. 1 is shown in a slightly larger form, but the host 110 may also be in a lighter form or other forms.

Figure 2:
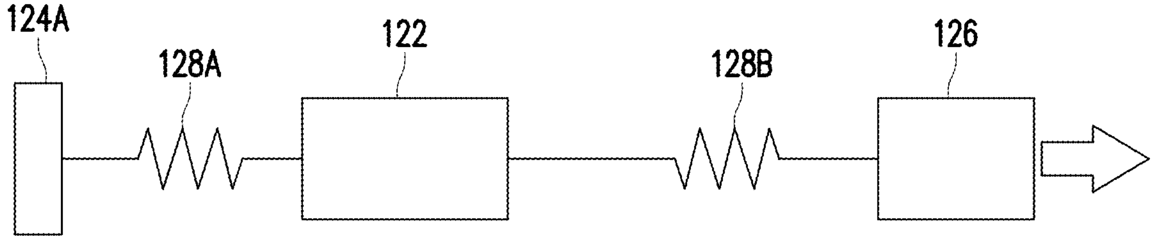
FIG. 2 is a schematic diagram of some components of a retractable headband of the head-mounted device in FIG. 1.

FIG. 2 is a schematic diagram of some components of a retractable headband of the head-mounted device in FIG. 1. Please refer to FIG. 1 and FIG. 2. In this embodiment, the retractable headband 120 further has a back head pad 126, a first spring 128A, and a second spring 128B. The back head pad 126 is used to contact the back of the head of the user to provide support and to increase wearing comfort. Two ends of the first spring 128A are connected to the earphone connection part 122 and the first connection end 124A. Two ends of the second spring 128B are connected to the earphone connection part 122 and the back head pad 126. An elastic coefficient of the first spring 128A is different from an elastic coefficient of the second spring 128B. Therefore, when the retractable headband 120 is elongated by an elongation amount, the change in the distance between the earphone connection part 122 and the first connection end 124A is less than half of the elongation amount. For example, a ratio of the elastic coefficient of the first spring 128A to the elastic coefficient of the second spring 128B is 45/25. When the half of the elongation amount of the retractable headband 120 is 70 mm, then the change in the distance between the earphone connection part 122 and the first connection end 124A is 25 mm. In addition, in other embodiments, the second spring 128B may not be connected to the back head pad 126, but may be connected to the retractable headband 120 at a position between the earphone connection part 122 and the back head pad 126. The first spring 128A may not be connected to the first connection end 124A, but may be connected to the retractable headband 120 at a position between the earphone connection part 122 and the first connection end 124A. If it is desired to obtain a specific ratio of the elongation amount of the retractable headband 120 to the movement amount of the earphone connection part 122, the desired outcome can be achieved by selecting to use the first spring 128A and the second spring 128B of specific ratios of elastic coefficients.

Figure 3:
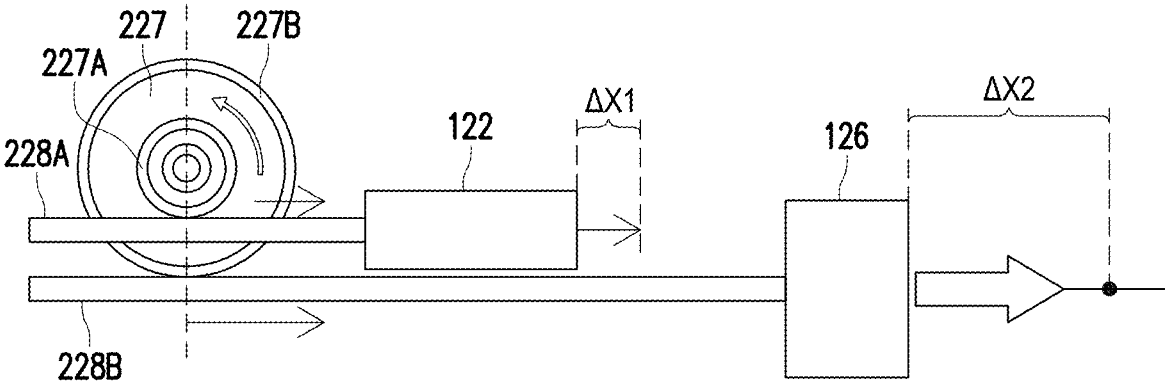
FIG. 3 is a schematic diagram of some components of the retractable headband of the head-mounted device according to another embodiment of the present invention.

FIG. 3 is a schematic diagram of some components of the retractable headband of the head-mounted device according to another embodiment of the present invention. In FIG. 3, only some components of the retractable headband are shown, and the complete head-mounted device and the retractable headband thereof are not shown. Therefore, related reference numerals are not marked. The retractable headband of the head-mounted device of this embodiment is roughly similar to the retractable headband 120 of FIG. 1 and FIG. 2. The difference is that a double-layer gear 227, a first rack 228A, and a second rack 228B are used instead of the first spring 128A and the second spring 128B. An end of the first rack 228A is connected to the earphone connection part 122 and the first rack 228A engages with a plurality of internal teeth 227A of the double-layer gear 227. An end of the second rack 228B is connected to the back head pad 126 and the second rack 228B engages with a plurality of external teeth 227B of the double-layer gear 227. Since the distance between the internal teeth 227A and the center of the double-layer gear 227 is smaller than the distance between the external teeth 227B and the center of the double-layer gear 227, when the double-layer gear 227 rotates, a distance of the second rack 228B being driven forward is greater than a distance of the first rack 228A being driven forward.

Specifically, when the user elongates the retractable headband, the back head pad 126 pulls the second rack 228B to move a distance ΔX2. In this way, the second rack 228B drives the double-layer gear 227 to rotate, and when the double-layer gear 227 rotates, the first rack 228A it also driven to move a distance ΔX1. The distance ΔX2 is greater than the distance ΔX1. That is, the change in the distance between the earphone connection part 122 and the first connection end 124A (shown in FIG. 1) is less than half of the elongation amount of the retractable headband. If it is desired to obtain a specific ratio of the elongation amount of the retractable headband to the movement amount of the earphone connection part 122, the desired outcome can be achieved by selecting to use a double-layer gear 227 with internal teeth and external teeth having specific ratios of elastic coefficients.

In summary, when the user is wearing the head-mounted device of the present application, pulling the retractable headband may elongate the headband to a length most suitable for the head circumference of the user, and during the elongating process, the earphone connection part is also driven to be moved to the appropriate location, so that the earphone corresponds to the ear of the user and deliver better sound quality, thereby convenience of wearing and better sound quality are provided.

What is claimed is:

1. A head-mounted device, comprising:

a host, having a first connection part and a second connection part located on two opposite sides;

a retractable headband, having an earphone connection part and a first connection end and a second connection end located on two opposite sides, wherein the first connection end is connected to the first connection part, the second connection end is connected to the second connection part, and when the retractable headband is elongated by an elongation amount, a change in a distance between the earphone connection part and the first connection end is less than half of the elongation amount; and an earphone, connected to the earphone connection part.

2. The head-mounted device as claimed in claim 1, wherein the retractable headband has a back head pad, a first spring, and a second spring, two ends of the first spring are connected to the earphone connection part and the first connection end, two ends of the second spring are connected to the earphone connection part and the back head pad, and an elastic coefficient of the first spring is different from an elastic coefficient of the second spring.

3. The head-mounted device as claimed in claim 1, wherein the retractable headband has a back head pad, a double-layer gear, a first rack, and a second rack, an end of the first rack is connected to the earphone connection part and the first rack engages with a plurality of internal teeth of the double-layer gear, and an end of the second rack is connected to the back head pad and the second rack engages with a plurality of external teeth of the double-layer gear.

4. The head-mounted device as claimed in claim 1, wherein the earphone is rotatable with respect to the retractable headband.

5. The head-mounted device as claimed in claim 1, wherein the earphone is magnetically attracted to the earphone connection part.

6. The head-mounted device as claimed in claim 1, wherein the retractable headband further has a sliding groove, and the earphone connection part is slidably disposed in the sliding groove.

7. A retractable headband for a head-mounted device, wherein the head-mounted device comprises a host and an earphone, the host has a first connection part and a second connection part located on two opposite sides, the retractable headband has an earphone connection part and a first connection end and a second connection end located on two opposite sides, the first connection end is configured to connect the first connection part, the second connection end is configured to connect the second connection part, and when the retractable headband is elongated by an elongation amount, a change in a distance between the earphone connection part and the first connection end is less than half of the elongation amount, and the earphone connection part is configured to connect the earphone.

8. The retractable headband as claimed in claim 7, further comprising a back head pad, a first spring, and a second spring, wherein two ends of the first spring are connected to the earphone connection part and the first connection end, two ends of the second spring are connected to the earphone connection part and the back head pad, and an elastic coefficient of the first spring is different from an elastic coefficient of the second spring.

9. The retractable headband as claimed in claim 7, further comprising a back head pad, a double-layer gear, a first rack, and a second rack, wherein an end of the first rack is connected to the earphone connection part and the first rack engages with a plurality of internal teeth of the double-layer gear, and an end of the second rack is connected to the back head pad and the second rack engages with a plurality of external teeth of the double-layer gear.

10. The retractable headband as claimed in claim 7, wherein the earphone connection part is configured to magnetically attract the earphone.

11. The retractable headband as claimed in claim 7, wherein the earphone is rotatable with respect to the retractable headband.

12. The retractable headband as claimed in claim 7, further comprising a sliding groove, wherein the earphone connection part is slidably disposed in the sliding groove.

* * * * *